US006510526B1

(12) United States Patent
Schoenborn

(10) Patent No.: US 6,510,526 B1
(45) Date of Patent: *Jan. 21, 2003

(54) DIFFERENTIAL CLOCKING FOR DIGITAL PLATFORMS

(75) Inventor: Theodore Zale Schoenborn, Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/471,307

(22) Filed: Dec. 23, 1999

(51) Int. Cl.[7] .................................................. G06F 1/04
(52) U.S. Cl. ........................................................ 713/500
(58) Field of Search ................................. 713/400, 500, 713/503

(56) References Cited

U.S. PATENT DOCUMENTS

| 3,745,361 | A | * | 7/1973 | Boyd et al. | ...................... 307/3 |
| 4,546,486 | A | * | 10/1985 | Evans | ......................... 375/374 |
| 5,121,411 | A | * | 6/1992 | Fluharty | ...................... 375/293 |
| 5,789,988 | A | * | 8/1998 | Sasaki | .......................... 331/25 |
| 5,834,980 | A | * | 11/1998 | Pitio et al. | ...................... 331/2 |
| 6,320,921 | B1 | * | 11/2001 | Gu | ............................... 375/376 |

* cited by examiner

Primary Examiner—Thomas M. Heckler
(74) Attorney, Agent, or Firm—Kenyon & Kenyon

(57) ABSTRACT

A method for recovering a clock signal communicated on a system bus. The method includes receiving at a receiver a first signal having a first polarity and receiving at the receiver a second signal having an opposite polarity to the first signal. The method also includes generating at the receiver a first clock signal based upon the first signal and the second signal.

30 Claims, 4 Drawing Sheets

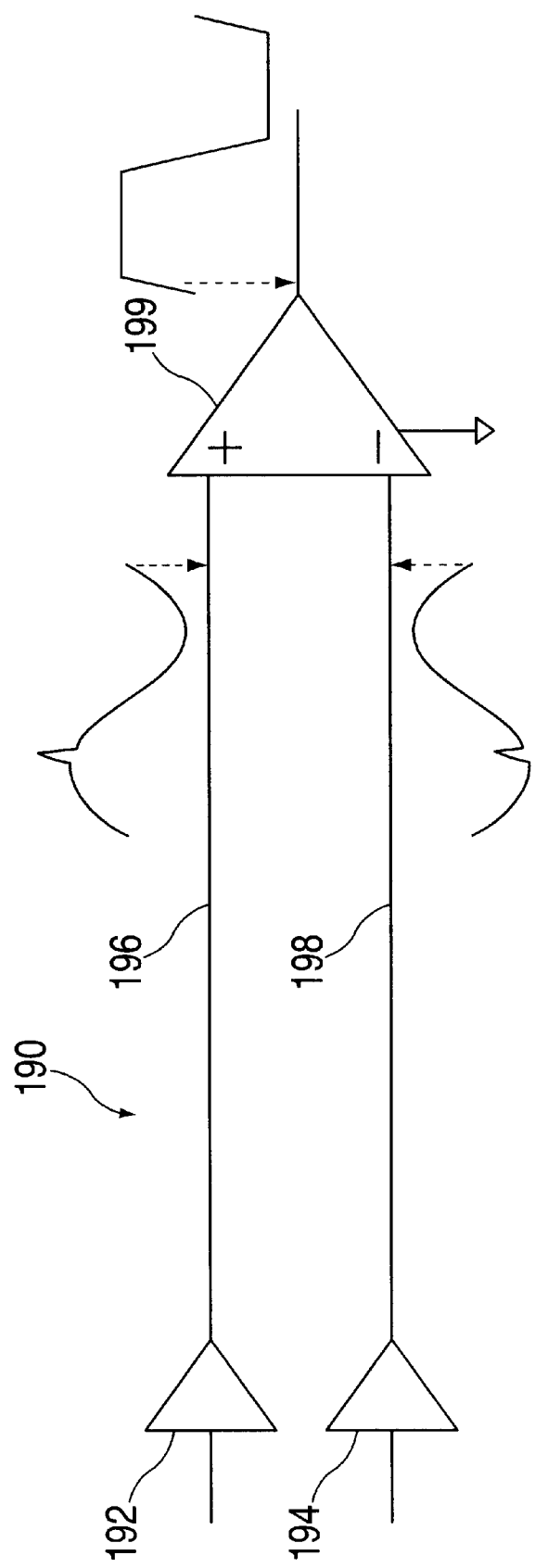

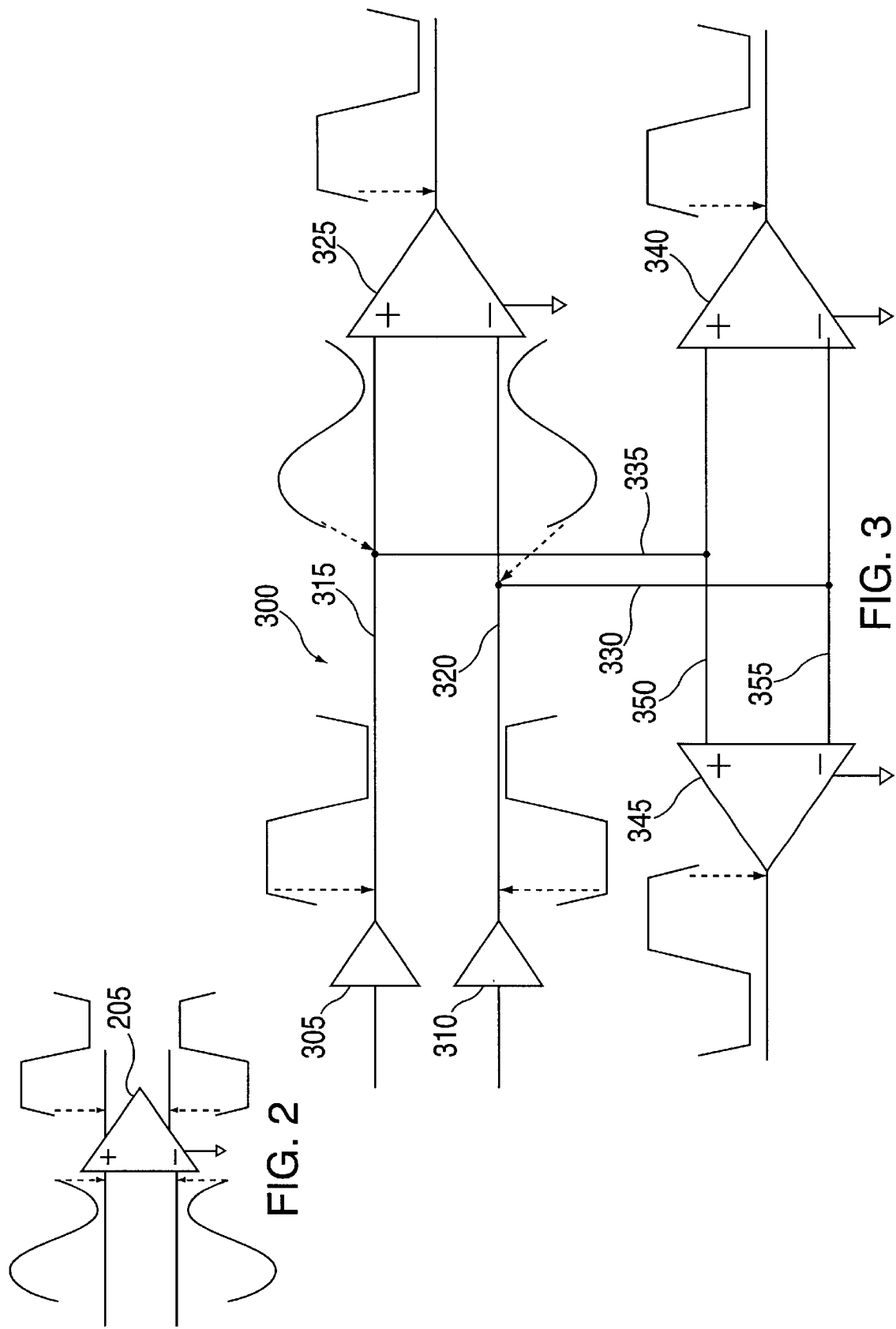

DIFFERENTIAL CLOCKING FOR DIGITAL PLATFORMS

FIELD OF THE INVENTION

The present invention pertains to the field of buses. More particularly, the present invention pertains to clock generation and recovery for a bus.

BACKGROUND OF TH INVENTION

Many systems have a bus including a set of transmission lines on which information and one or more clock signals are communicated between various circuits. For example, digital computers have a bus for communicating among circuits such as processors, memory, direct memory access controllers, graphics processors among many other circuits. The bus may include transmission lines for data, addresses, and a system clock. The clock signal on the system clock line provides a time reference by which circuits connected to the bus are synchronized. Keeping an accurate time reference influences the reliable transfer of information on the data and address lines and the reliable use of the bus by the various circuits connected to the bus.

Unfortunately, conventional clock signals may be 1) susceptible to many sources of error and 2) may contribute to the noise environment of the system. For example, most clock signals have a single-ended substantially square or trapezoidal shape that is characterized by a fundamental frequency (Fo), duty cycle, and edge rate. The nature and characteristics of the clock signals make them susceptible to a variety of undesirable effects produced by impedance discontinuities and noise, among other sources of error. Furthermore, the broadband or wide band characteristics of conventional clock signals may cause interference with other signals and devices in the system.

First, because of the shape of the signal, the signal typically has significant high frequency components which are higher in frequency than the fundamental frequency. Consequently, the signal may occupy a bandwidth that is five times to ten times the fundamental frequency. Unfortunately, transmission lines do not typically provide uniform transmission of the wide band of frequencies contained in the typical clock signal. For example, any type of impedance discontinuity is frequency dependent, causing signal integrity problems that add skew to the system. This problem may result in the improper latching of data causing improper operation.

Second, the clock signal is affected by skew/jitter that may result from power plane noise, simultaneous switching output noise coupling, and impedance mismatches in the transmission lines. The effects of these skew/jitter sources are difficult to reject at a receiver that receives a single-ended signal. The effects of these skew/jitter sources on the signal may lead to improper operation and lack of synchronization.

Third, conventional clock signals, such as substantially trapezoidal or rectangular waves, present a significant electromagnetic interference (EMI) problem because of the many harmonics contained in such signals. The presence of many harmonics with significant power creates fields that may undesirably couple various elements in a system or interfere with other signals in the system.

Since having a wide band clock signal causes problems in crossing impedance discontinuities, it would be advantageous to generate a clock signal that is less problematic when crossing impedance discontinuities. Additionally, since generating a single-ended signal is not effective for minimizing the effects of the skew/jitter sources, it would be advantageous to generate and recover a clock signal in a manner that would allow rejection of the effects of the skew/jitter sources. Furthermore, since the presence of many harmonics in a clock signal is undesirable, it would be advantageous to generate a clock signal which does not present a significant EMI problem.

SUMMARY OF THE INVENTION

According to an embodiment of the invention, a method for recovering a clock signal communicated on a system bus is described. The method includes receiving at a receiver a first signal having a first polarity and receiving at the receiver a second signal having an opposite polarity to the first signal. The method also includes generating at the receiver a first clock signal based upon the first signal and the second signal.

BRIEF DESCRIPTIONS OF THE DRAWINGS

The present invention is illustrated by way of example, and not limitation, in the figures of the accompanying drawings in which:

FIG. 1e illustrates a block diagram representation of a clock generation and recovery circuit experiencing noise for an embodiment in accordance with the present invention;

FIG. 2 illustrates a block diagram representation of a clock generation and recovery circuit experiencing noise for an embodiment in accordance with the present invention;

FIG. 3 illustrates a block diagram representation of a clock generation and recovery circuit for another embodiment in accordance with the present invention;

DETAILED DESCRIPTION

A method and apparatus for generating and recovering clock signals is described. In the following description, for purposes of explanation, numerous specific details are set forth in order to provide a thorough understanding of the present invention. It will be appreciated, however, by one skilled in the art that the present invention may be practiced with any type of bus, especially digital buses, without these specific details. In other instances well known operations, functions and devices are not shown in order to avoid obscuring the invention.

Currently most clock distribution systems propagate a single ended substantially trapezoidal (or square) wave signal which is characterized by a fundamental frequency (Fo), duty cycle, and edge rate. The clock signal of conventional clock distribution systems can be described as a trapezoidal or square wave, wide band signal or using other terms known in the art. These terms are used interchangeably herein. The clock signal often has a fast edge rate (or steep rise time) so that noise will not affect the timing. A fast edge rate causes the signal to contain a wide band of frequencies. The edge rates typically cause the signal to have a frequency content on the order of 5 to 10 times Fo which translates to a frequency bandwidth of 5 to 10 times Fo. Unfortunately, having a wide band of frequencies in the clock signal may have a detrimental effect on the distribution of the clock signal in most clock distribution systems.

Most clock distribution systems or transmission networks have a multi-load topology (i.e., they are not strict point-to-point circuits without branches) which typically does not provide uniform transmission of the wide band of frequencies contained in substantially trapezoidal wave signals having a fast edge rate. Impedance discontinuities at the points where the system clock interconnects branch apart or divide have an effect on the propagation of the clock signal that is frequency dependent. A discontinuity's frequency dependent effect on the clock signal causes signal integrity problems that add skew to the system. Skew is the delay in the arrival of the signal at various points in the system. Skew can cause improper operation by causing inappropriate latching of a data signal, for example. For clock signals having a high enough fundamental frequency, the signal integrity problems may constrain the routing of the system clock interconnects to the simplest point-to-point type systems.

Figure 1A:
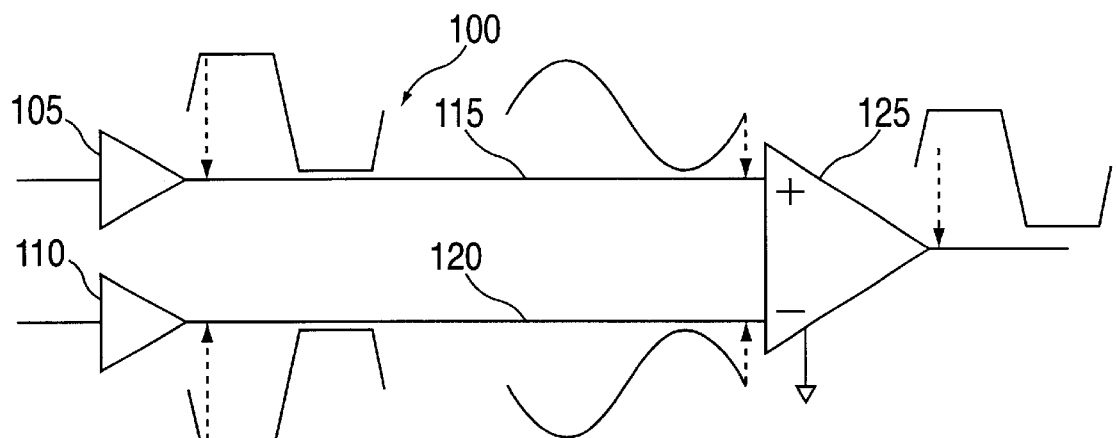
FIG. 1a illustrates a block diagram representation of a clock generation and recovery circuit for one embodiment in accordance with the present invention.

It is desirable to have a clock signal that does not suffer as badly from impedance discontinuities as the single-ended substantially trapezoidal wave signals. In one embodiment, the present invention provides a clock signal that does not suffer as badly from impedance discontinuities as the single-ended substantially trapezoidal wave signals. FIG. 1a illustrates a block diagram representation of a clock generation and recovery circuit for one embodiment in accordance with the present invention. Clock circuit 100 propagates opposite polarity signals down a pair of lines to a differential receiver. Clock circuit 100 includes drivers 105–110, transmission lines 115–120, and differential receiver 125. Drivers 105–110 generate substantially trapezoidal waves for application to lines 115–120, respectively. The substantially trapezoidal waves travel down lines 115–120 and, in the process of traveling down lines 115–120, attenuate or lose some of the high frequency components in the trapezoidal waves. Consequently, the trapezoidal waves may become substantially sinusoidal by the time they reach receiver 125. Receiver 125 produces at its output a signal that is based upon the difference between the substantially sinusoidal signals at the inputs to receiver 125. While the clock signal at the output of receiver 125 is non-linear, in an alternative embodiment in accordance with the present invention the output may be linear.

There are several benefits to distributing substantially sinusoidal signals. For example, by allowing the originally trapezoidal signals to become substantially sinusoidal and by distributing the substantially sinusoidal signals the interconnect design spaces will increase because the differential clock signal would only be one frequency (or narrow band). This is significant differential square or trapezoidal waves can experience poor transmission to the receiver circuitry because discontinuities can reject a large portion of the frequency content of square or trapezoidal waves.

Figure 1B:
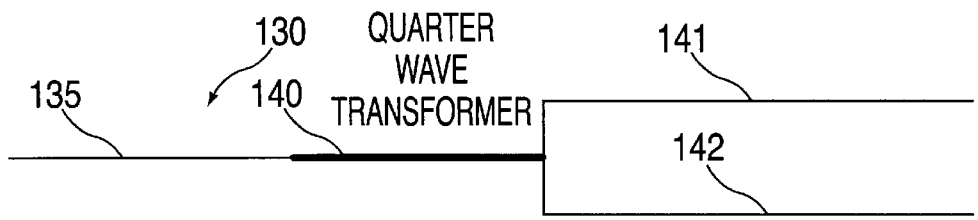
FIG. 1b illustrates a quarter wave transformer which matches a transmission line to a branch of two lines.
Figure 1C:
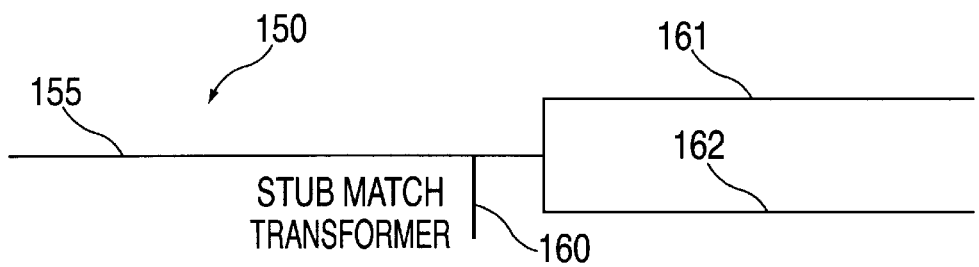
FIG. 1c illustrates a stub matching transformer which matches a transmission line to a branch of two lines.
Figure 1D:
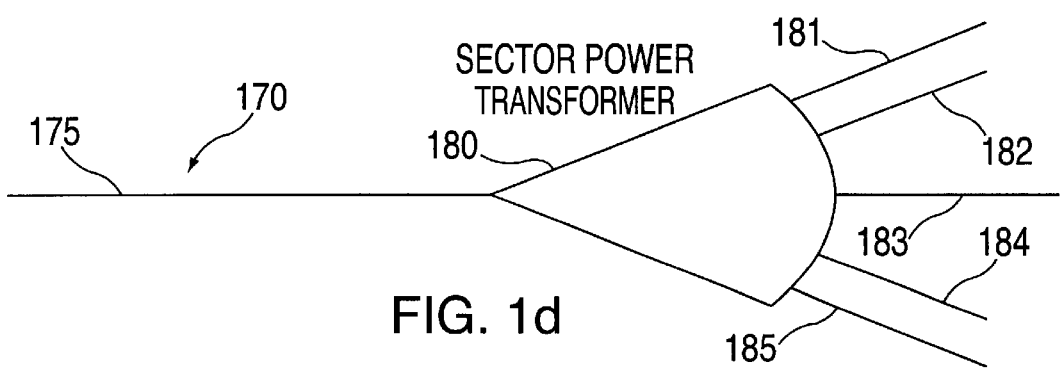
FIG. 1d illustrates a sector power transformer which matches a transmission line to a branch of several lines.

Additionally, using a narrow band clock allows the use of interconnect optimization techniques employed in transmitting microwave signals, which cannot be used when using a traditional digital signal. The techniques include but are not limited to: quarter wave transformers, power splitters, stub matching, and isolation networks. FIGS. 1b, 1c, and 1d illustrates some of the possible routing implementations. FIG. 1b illustrates a transmission line 130 including a transmission line segment 135 and a quarter wave transformer 140 which matches segment 135 to a branch of lines 141–142. FIG. 1c illustrates a transmission line 150 including a transmission line segment 155 and stub matching transformer 150 which matches segment 155 to a branch of lines 161–162. FIG. 1d illustrates a transmission line 170 including a transmission line segment 175 and sector power transformer 180 which matches segment 175 to lines 181–185.

Furthermore, since a substantially sine wave is largely composed of a single frequency, harmonics would be reduced or eliminated. This is beneficial because the higher clock harmonics are usually the biggest EMI offenders in a system. In addition, the differential nature of the proposed clock distribution would also cause the net fields to be reduced by many times over single ended clock distributions because of field cancellation.

The differential nature of the clock distribution also allows the differential receiver to reject many types of noise in the transmission lines and that would likely cause problems for single-ended receivers receiving a single-ended signal. FIG. 1e illustrates a block diagram representation of a clock generation and recovery circuit experiencing noise for an embodiment in accordance with the present invention. Clock circuit 190 operates in the same manner as circuit 100 described above. Circuit 190 includes drivers 192–194, transmission lines 196–198, and differential receiver 199. Drivers 192–194 generate substantially trapezoidal waves for application to lines 196–198, respectively. The substantially trapezoidal waves travel down lines 196–198 and, in the process of traveling down line 196–198, attenuate or lose some of the high frequency components in the trapezoidal waves. Consequently, the trapezoidal waves become substantially sinusoidal by the time they reach receiver 199. However, noise has also come into the signals. The advantage of having a differential pair of substantially sinusoidal wave signals according to one embodiment of the present invention is demonstrated in FIG. 1e. As shown in FIG. 1e, if common mode noise couples to the signals on lines 196–198, receiver 199 rejects the noise and outputs a clock signal that is largely free of the effects of noise on the signal inputs. Common mode noise rejection minimizes the skew/jitter from power plane noise, coupling or simultaneous switching output noise, and interconnect or impedance discontinuities. This property is due to the fact that skew/jitter sources are common to both of the signal lines, but the receiver attempts to reject these common sources and amplifies only the differences.

The differential signal nature of the clock distribution also allows less power to be consumed relative to the power consumed with a single ended signal which has full rail swings, for equivalent noise environments and differential receiver sensitivity. It should be appreciated that a differential voltage has twice the swing at the receiver as compared to a single ended signal.

The differential signal nature of the clock distribution imposes smaller di/dt noise on the power planes relative to single-ended substantially trapezoidal signal distributions. This is due to one signal line drawing current from the power plane while the other line is dumping current into the power plane. Consequently, the lines are constantly sharing charge, and the net di/dt is much smaller than a single ended line. This is compounded by the fact that the di/dt of a sine wave signal is always smaller than a similar trapezoidal or square wave signal.

While in FIG. 1a and FIG. 1b only one receiver is illustrated, it should be appreciated that alternative embodiments in accordance with this invention may have more receivers which can be divided into groups of at least one receiver, where each group resides on an integrated circuit or within another type of circuit.

While in FIG. 1a receiver 125 generates a single clock signal, in an alternative embodiment in accordance with the present invention, a receiver may generate two clock signals having opposite polarities as shown in FIG. 2 with regards to receiver 205.

While in FIG. 1a, circuit 100 shows two point-to-point lines, it should be appreciated that this invention can be practiced with circuits having multi-load topologies in which lines divide or branch out multiple times before each line or branch of a line reaches its final destination at a receiver, for example. FIG. 3 illustrates a block diagram representation of a clock generation and recovery circuit for another embodiment in accordance with the present invention. Circuit 300 includes receiver 325 which receives substantially sinusoidal signals along lines 315–320 from drivers 305–310. Lines 315–320 branch into lines 330–335, respectively, which couple to lines 350–355, respectively. Receivers 340 and 345 receive the substantially sinusoidal signal from lines 350–355. For one embodiment in accordance with the present invention, each of receivers 325, 340, and 345 resides in a separate integrated circuit. Lines 315–320, lines 330–335 and lines 350–355 may employ one or more of the microwave matching techniques described above in connection with FIGS. 1b, 1c, and 1d because the substantially sinusoidal signal traveling down lines 315–320, lines 330–335 and lines 350–355 is a narrow band signal. Since the clock signal traveling down the lines is a narrow band signal, microwave matching techniques may be used to substantially ameliorate the significant impedance discontinuities that would otherwise occur at the points where lines 315–320 intersect with lines 330–335, respectively, and where lines 330–335 intersect with lines 350–355.

Figure 4A:
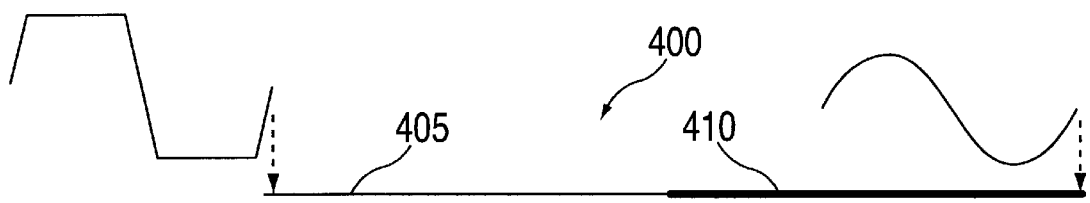
FIG. 4a illustrates a transmission line in accordance with one embodiment of the present invention.
Figure 4B:
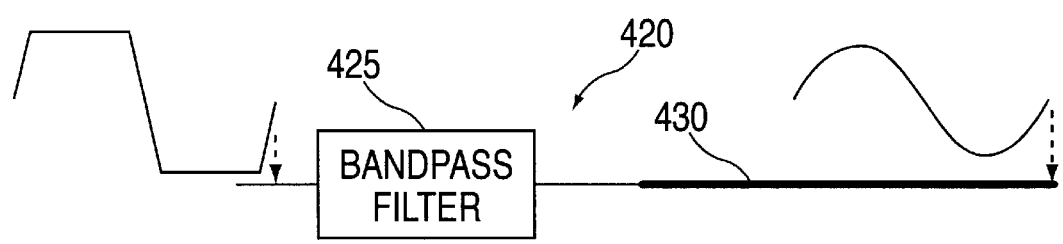
FIG. 4b illustrates a transmission line in accordance with another embodiment of the present invention.

While in FIG. 1a and FIG. 3 lines 115–120 and lines 315–320, respectively, are sufficiently long that a substantially trapezoidal signal becomes a substantially sinusoidal signal, for an alternative embodiment in accordance with this invention the lines may be divided into two segments one of which causes the high-frequency components of the substantially trapezoidal wave signal to be attenuated relatively quickly or in a short distance. FIG. 4a, for example, illustrates a transmission line in accordance with one embodiment of the present invention. Line 400 is representative of lines 115–120 and lines 315–320, above, in one embodiment. Line 400 has a first segment 405 and a second segment 410. Segment 405 has a high resistance which substantially attenuates the high frequency components of a substantially trapezoidal signal applied to line 400. Consequently, the substantially square signal is transformed into a substantially sinusoidal signal when it arrives at segment 410 or the input to a receiver. It should be appreciated that in an alternative embodiment in accordance of the present invention segment 405 may be replaced by a narrow bandpass filter as shown in FIG. 4b. FIG. 4b illustrates a transmission line in accordance with another embodiment of the present invention Line 420 includes bandpass filter 425 and segment 430. Bandpass filter 425 attenuates the substantially trapezoidal signal such that at the output of filter 425 a substantially sinusoidal signal emerges to travel through segment 430.

While FIG. 4a and FIG. 4b illustrate two methods for turning a wide band signal into a narrow band signal, it should be appreciated that in an alternative embodiment in accordance with this invention substantially sinusoidal signals may be generated by drivers for application to transmission lines directly.

Figure 5:
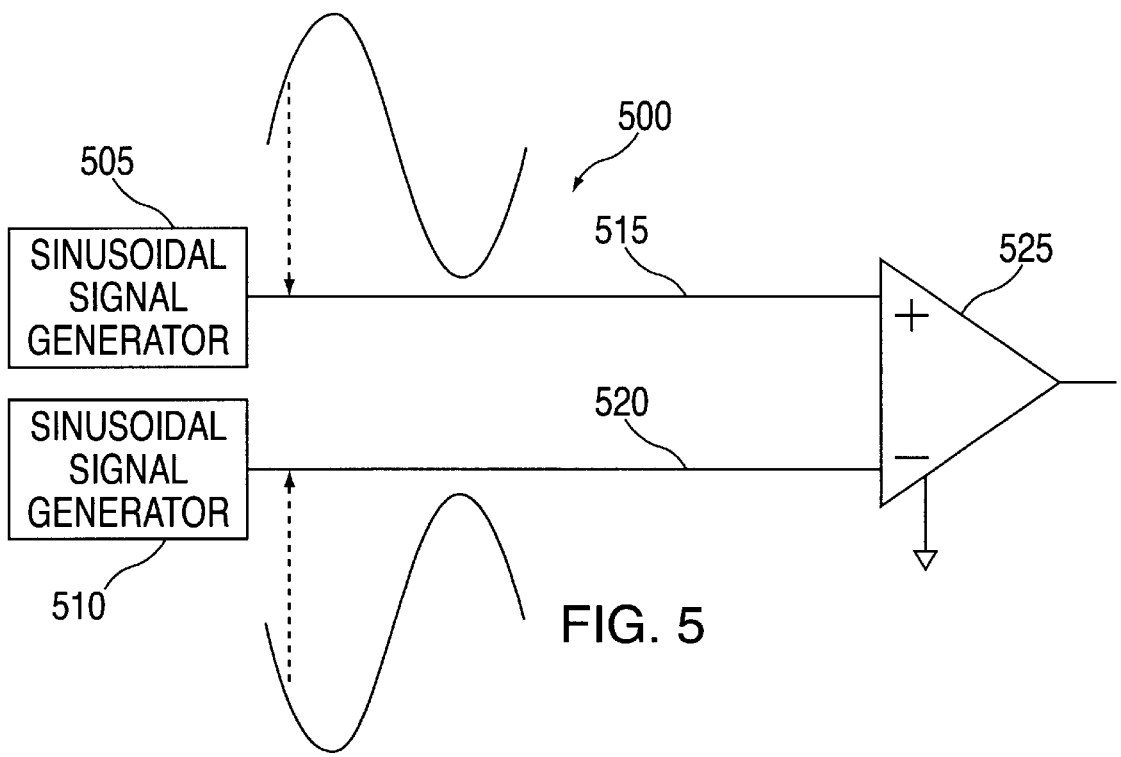
FIG. 5 illustrates a block diagram representation of a clock generation and recovery circuit for yet another embodiment in accordance with the present invention.

For example, FIG. 5 illustrates a block diagram representation of a clock generation and recovery circuit for yet another embodiment in accordance with the present invention. Circuit 500 largely operates in the same manner as circuit 100 described above. The description given above with regards to circuit 100 is also applicable to circuit 190 and need not be repeated here. Unlike circuit 100 which has drivers producing substantially trapezoidal signals, circuit 500 includes sinusoidal signal generators 505–515 which apply substantially sinusoidal signals of opposite polarity to lines 515–520. Consequently, receiver 525 receives substantially sinusoidal signals from lines 515–520.

It should be appreciated that there are many advantages to propagating substantially sinusoidal opposite polarity or differential signals. For example, embodiments in accordance with the present invention may have one or more of the following benefits: 1) reduced clock skew; 2) reduced electromagnetic interference (EMI) problems; 3) simplified design to ensure signal integrity; 4) reduced system ground bounce; 5) lower power consumption by the clock; and 6) permitted reuse of routing designs for clock frequencies below a gigahertz (Ghz) at clock frequencies above one gigahertz. Thus, a method and apparatus for generating and recovering clock signals has been described. Although the present invention has been described with reference to specific exemplary embodiments, it will be appreciated by one of ordinary skill in the art that various modifications and changes may be made to these embodiments without departing from the broader spirit and scope the invention as set forth in the claims. Accordingly, the specification and drawings are to be regarded in an illustrative rather than a restrictive sense.

What is claimed is:

1. A method for recovering a clock signal communicated on a system bus, comprising:
   receiving at a receiver a first signal having a first polarity;
   receiving at the receiver a second signal having an opposite polarity to the first signal; and
   generating at the receiver a first clock signal based upon the first signal and the second signal.

2. The method of claim 1, wherein the first signal is substantially sinusoidal at the receiver.

3. The method of claim 1, further comprising generating the first signal.

4. The method of claim 1, wherein the first clock signal has a first clock signal polarity, further comprising generating a second clock signal having a second clock signal polarity opposite from the first clock signal polarity.

5. The method of claim 1, further comprising:
   generating a first substantially square wave signal; and
   removing high frequency components of the first substantially square wave signal to produce the first signal.

6. The method of claim 5, further comprising:
   generating a second substantially square wave signal; and
   removing high frequency components of the second substantially square wave signal to produce the second signal.

7. The method of claim 5, wherein removing high frequency components includes passing the first substantially square wave signal through a line having a first portion that attenuates the high frequency components.

8. The method of claim 1, further comprising passing the first signal through a quarter wave transformer.

9. The method of claim 1, further comprising passing the second signal through a quarter wave transformer.

10. The method of claim 1, further comprising passing the first signal through a stub match transformer.

11. The method of claim 1, further comprising passing the first signal through a sector power transformer.

12. The method of claim 1, further comprising receiving at an integrated circuit the first signal and the second signal.

13. An apparatus for recovering a clock signal that is to be received from a system bus, comprising:

a receiver that is to receive a first signal having a first polarity and a second signal having an opposite polarity to the first signal; and the receiver is to generate a first clock signal based upon the first signal and the second signal.

14. The apparatus of claim 13, further comprising a system including a transmission line, wherein the receiver is adapted to be coupled to transmission line of the system bus.

15. The apparatus of claim 13, wherein the first signal is substantially sinusoidal at the receiver.

16. The apparatus of claim 13, further comprising:

a bus including a first transmission line and a second transmission line;

wherein the receiver is coupled to the first transmission line and the second transmission line;

a first generator that is to generate the first signal for application to the first transmission line; and a second generator that is to generate the second signal for application to the second transmission line.

17. The apparatus of claim 13, further comprising:

a bus including a first transmission line and a second transmission line;

wherein the receiver is coupled to the first transmission line and the second transmission line;

a first generator that is to generate a first substantially square wave signal having a first polarity for application to the first transmission line; and a second generator that is to generate a second substantially square wave signal having a second polarity opposite of the first polarity for application to the second transmission line.

18. The apparatus of claim 17, wherein the first transmission line and the second transmission line are to remove high frequency components from the first substantially square wave signal and the second substantially square wave signal, respectively, to produce the first signal and the second signal, respectively.

19. The apparatus of claim 17, wherein the first transmission line has a first portion and a second portion, wherein the first portion has a higher resistivity than the second portion.

20. The apparatus of claim 13, further comprising a first transmission line coupled to the receiver, the first transmission line includes a quarter wave transformer, and the first signal is to pass through the quarter wave transformer.

21. The apparatus of claim 13, further comprising a second transmission line coupled to the receiver, the second transmission line includes a quarter wave transformer, and the second signal is to pass through the quarter wave transformer.

22. The apparatus of claim 13, further comprising a first transmission line coupled to the receiver, the first transmission line includes a stub match transformer across which the first signal is to pass.

23. The apparatus of claim 13, further comprising a first transmission line coupled to the receiver, the first transmission line including a sector power transformer through which the first signal is to pass.

24. The apparatus of claim 13, further comprising an integrated circuit, and the integrated circuit includes the receiver.

25. An apparatus for recovering a clock signal that is to be received from a system bus, comprising:

a receiver that receives a first signal having a first polarity and a second signal having an opposite polarity to the first signal; and the receiver generates a first clock signal based upon the first signal and the second signal.

26. An apparatus for recovering a clock signal that is to be received from a system bus, comprising:

a bus including a first transmission line and a second transmission line;

a receiver that is to receive on the first transmission line a first signal having a first polarity and on the second transmission line a second signal having an opposite polarity to the first signal; and the receiver is to generate a first clock signal based upon the first signal and the second signal.

27. An apparatus for generating a clock signal for application to a system bus, comprising:

a first signal generator that is to generate a first signal for application to a first transmission line of a system bus;

a second signal generator that is to generate a second signal for application to a second transmission line of a system bus; and the first signal has a first signal polarity that is opposite to the polarity of the second signal and a clock signal is based upon the first signal and the second signal.

28. The apparatus of claim 27, wherein the first signal has a substantially square wave shape.

29. The apparatus of claim 28, further comprising:

a first transmission line coupled to the first signal generator;

a receiver coupled to the first transmission line;

first transmission line is to attenuate the first signal such that the first signal has a substantially sinusoidal shape when the first signal arrives at the receiver.

30. The apparatus of claim 27, wherein the first signal is substantially sinusoidal.

* * * * *